United States Patent [19]

Ericson et al.

[11] 4,032,207
[45] June 28, 1977

[54] HIGH CURRENT ELECTRICAL JOINT APPARATUS

[75] Inventors: Eric Axel Ericson, Plainville; Frederick Daniel Kaufhold, Forestville, both of Conn.

[73] Assignee: General Electric Company, New York, N.Y.

[22] Filed: June 21, 1976

[21] Appl. No.: 698,280

[52] U.S. Cl. .......................... 339/75 M; 339/22 B; 339/92 M
[51] Int. Cl.² ........................................ H01R 13/62
[58] Field of Search ............ 339/22 B, 75 R, 75 M, 339/91 R, 92 R, 92 M

[56] References Cited
UNITED STATES PATENTS

| | | | |
|---|---|---|---|
| 3,021,499 | 2/1962 | Rascati | 339/22 B |
| 3,820,057 | 6/1974 | Joly | 339/22 B |

Primary Examiner—Roy Lake
Assistant Examiner—E. F. Desmond
Attorney, Agent, or Firm—Robert A. Cahill; Walter C. Bernkopf; Frank L. Neuhauser

[57] ABSTRACT

Electrical joint apparatus includes an array of stab connectors each having plural contact fingers and an array of receiver connectors each having contact fingers arranged in lapped relation with the contact fingers of an associated stab connector. A clamping rod extends freely through apertures in the stab fingers and carries springs at each end of the stab connector array. A first cam follower, affixed to one end of the rod, and a second cam follower movably supported on the rod, are driven in opposite directions by a cam, such as to uniformly load the springs and thereby develop equal and oppositely directed forced clamping the lapped fingers in electrical interconnection.

15 Claims, 30 Drawing Figures

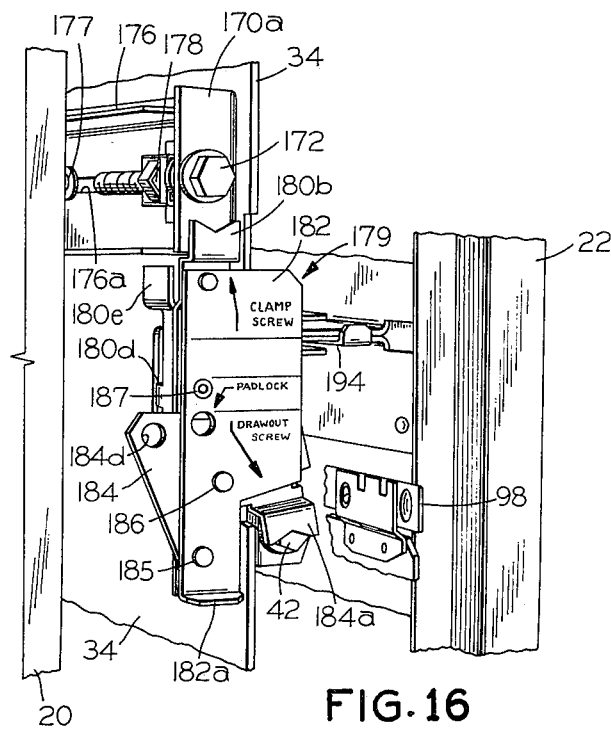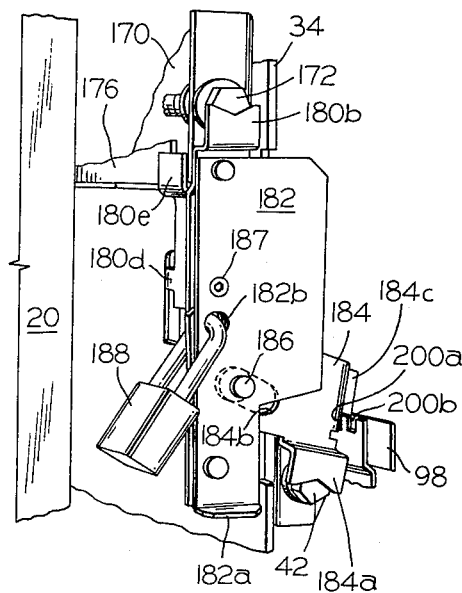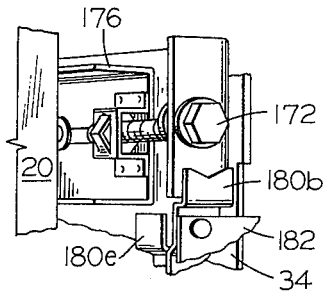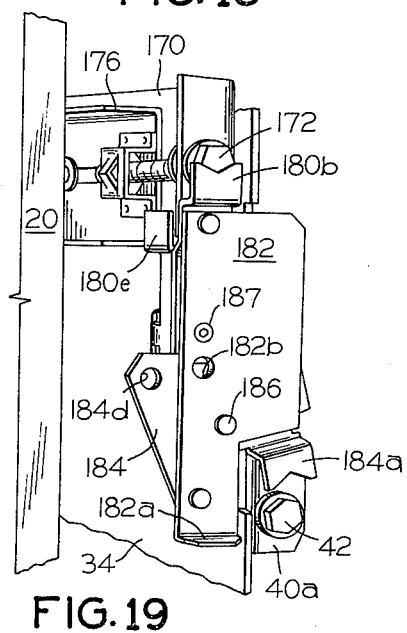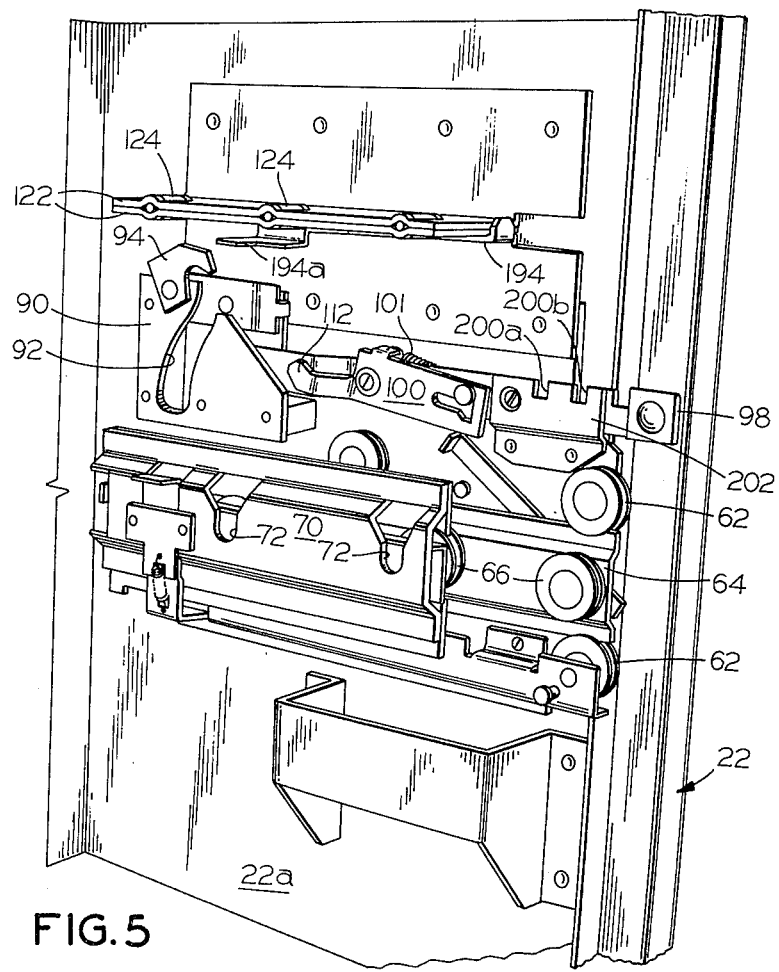

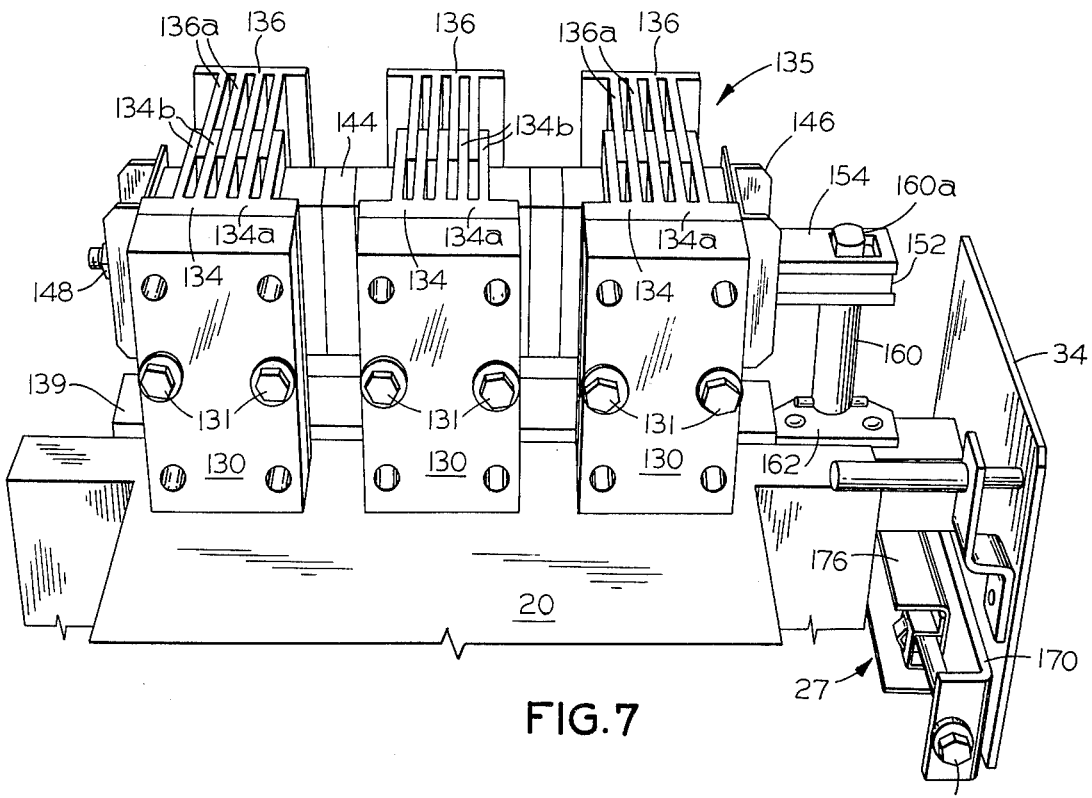
FIG. 7
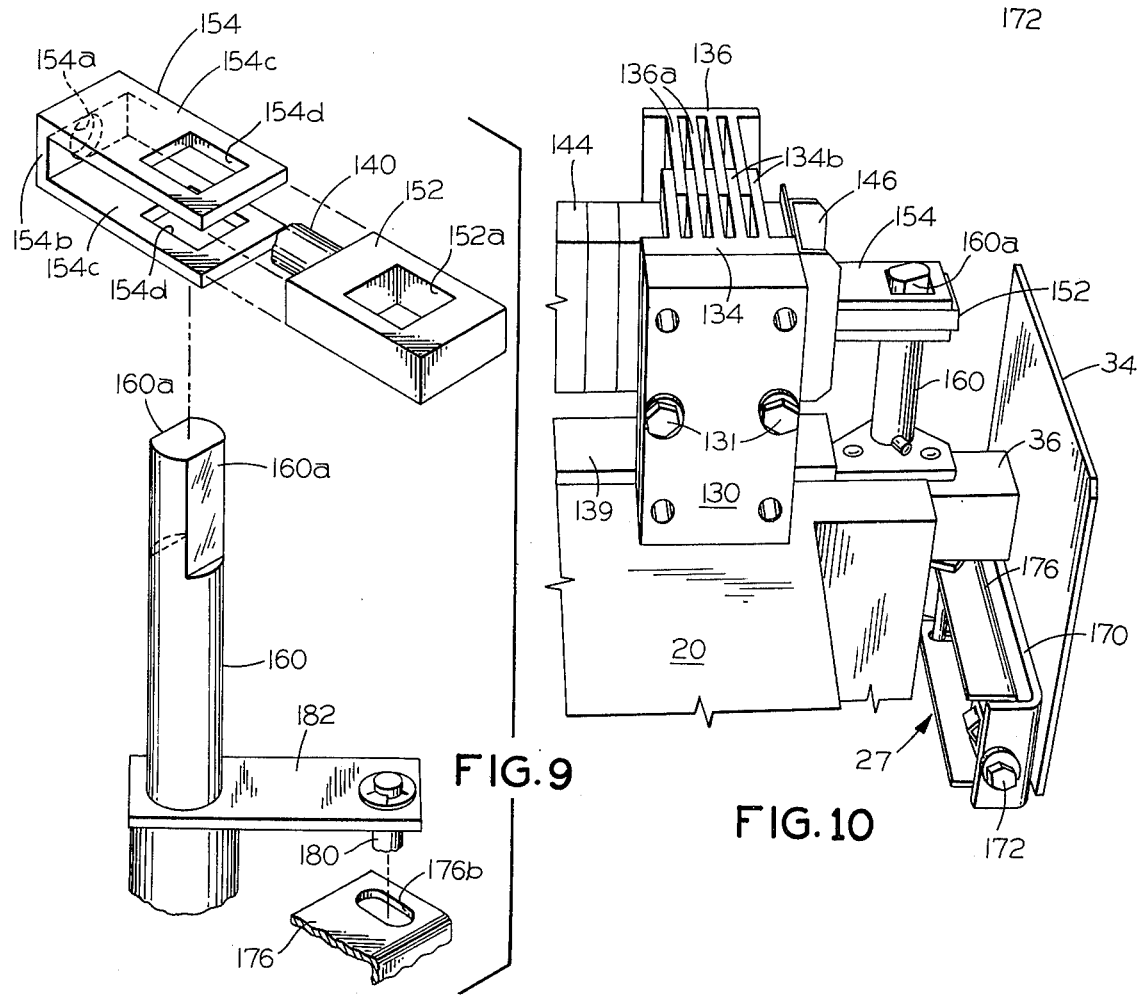
FIG. 9
FIG. 10

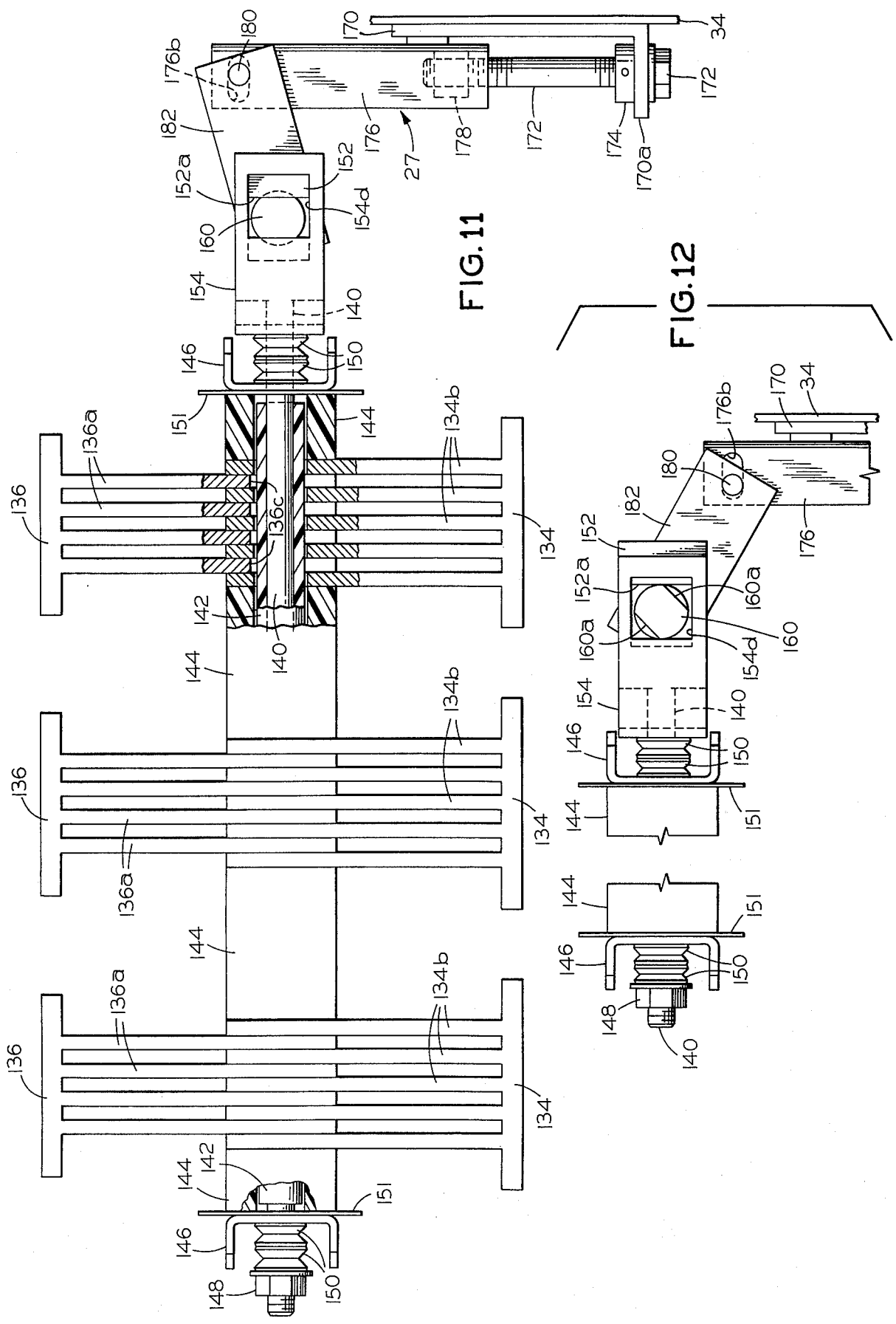

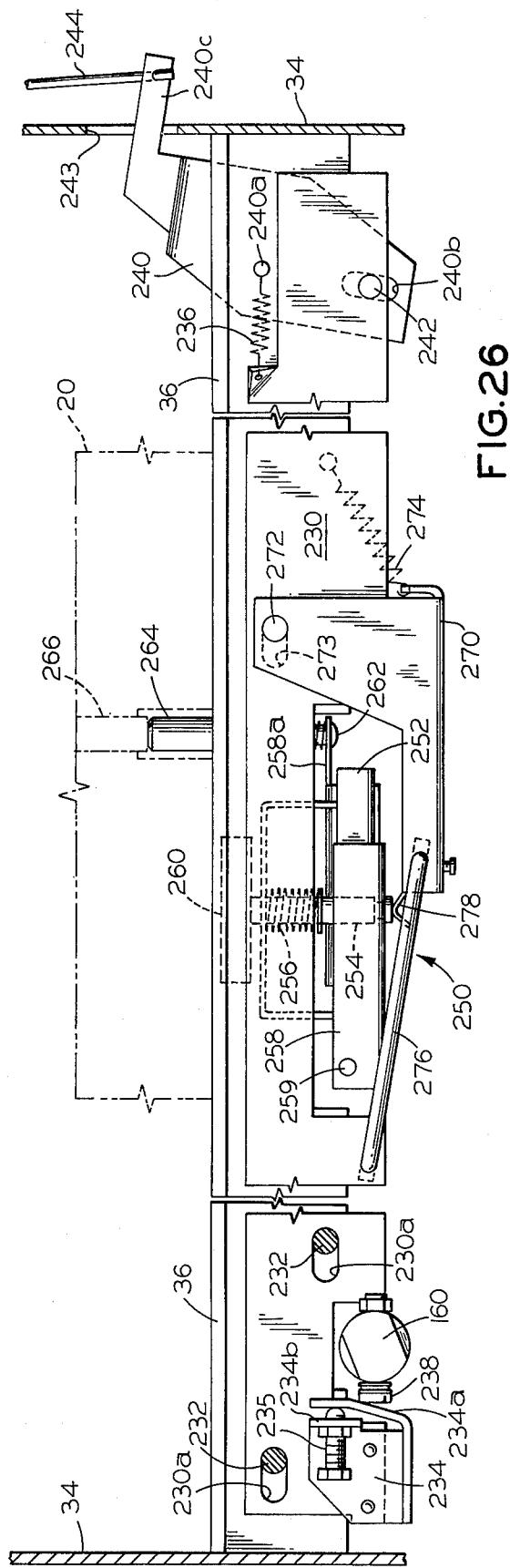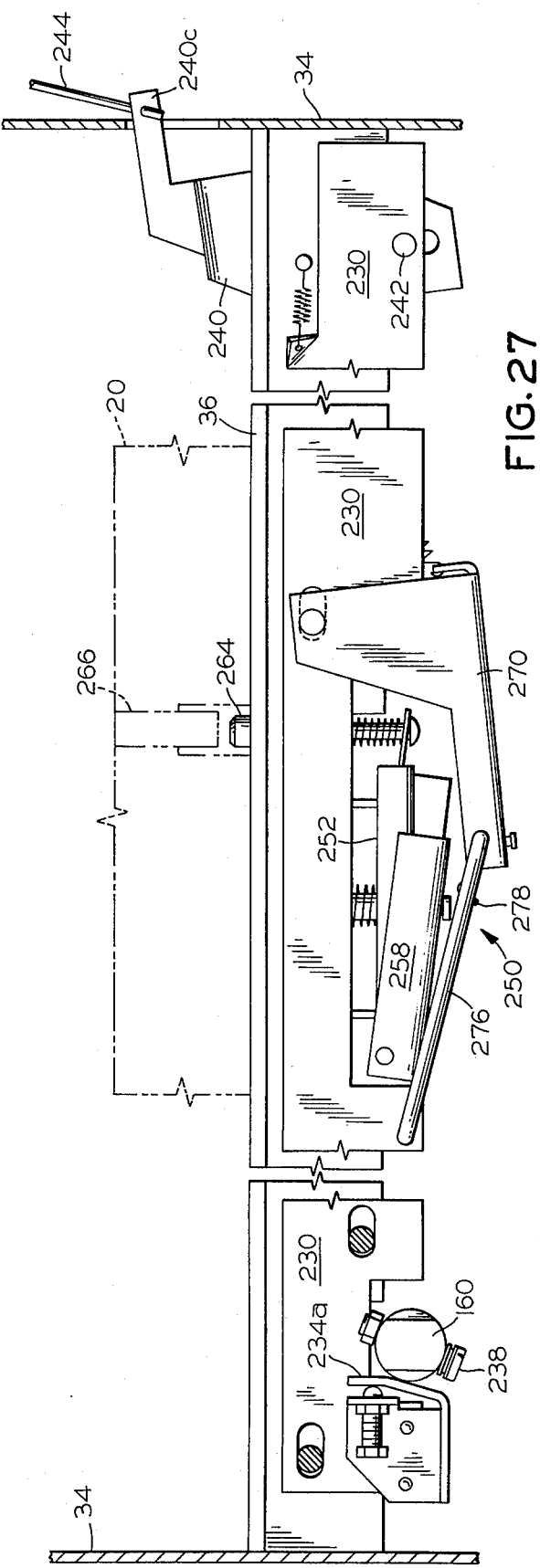

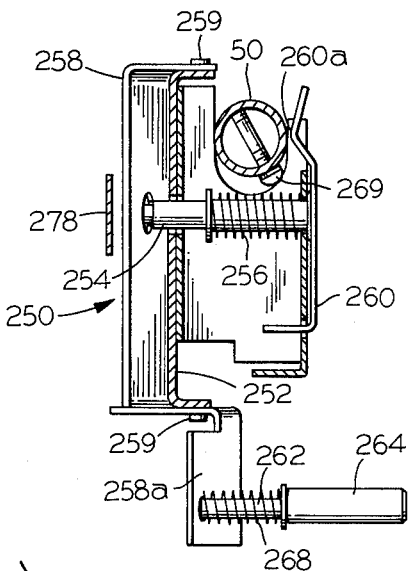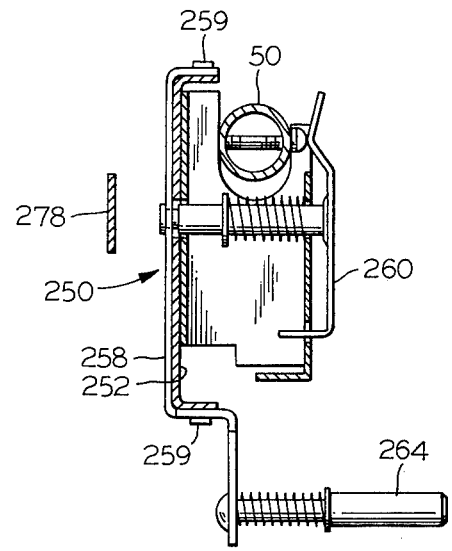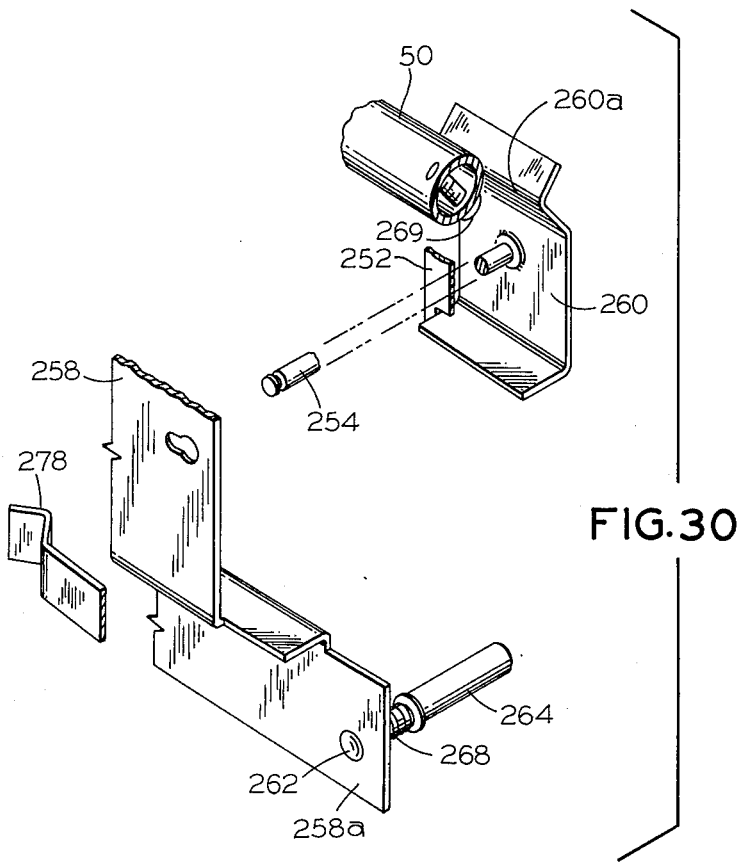

HIGH CURRENT ELECTRICAL JOINT APPARATUS

BACKGROUND OF THE INVENTION

Drawout apparatus are well known expedients for facilitating the installation and removal of physically large electrical devices, such as switches and circuit breakers, with respect to switchboards and panelboards. The device is provided with plug-in or stab-type disconnect primary contacts which mate in electrical interconnection with complementary switchboard primary disconnect contacts incident to racking movement of the device to its innermost, engaged position, thereby making the electrical joints requisite to electrically connecting the device into the switchboard.

In higher current applications, the devices become quite large and heavy, thus rendering the bodily movement of the devices necessary to electrically connect and disconnect them from the switchboard extremely cumbersome without structure supporting the device in its racking movement. Moreover, as current ratings increase, the requisite high contact pressures embodied in the primary disconnect contacts become extremely difficult, if not impossible, to overcome without mechanical assistance. Thus, drawout apparatus for accommodating these larger electrical devices typically include not only provisions for supporting the device during racking movement, but also various camming or levering mechanisms operating to mechanically assist the racking movement of the device at least during that segment of travel necessary to engage and disengage the device-switchboard primary disconnect contacts.

The principle limitation to the utilization of drawout apparatus is the ability of the plug-in primary therminal joints to carry the increasingly higher currents called for in many applications. These joints are sources of heat which can contribute to an intolerable high temperature condition within the switchboard. The spring forces incorporated in such plug-in terminal connectors and their mutual contact surface areas, which will accommodate sliding relative movements of the mating connectors incident to making and breaking the plug-in joints, are not sufficient to achieve a cool running joint in high current applications. Consequently, bolted terminal joints must be resorted to, and, as a result, the signal advantage in drawout installations of being able to connect and disconnect a device from a live switchboard without having to operate directly on the primary terminal joint is lost.

It is accordingly an object of the present invention to provide improved electrical joint apparatus of high current capacity having particular but not limited application in switchboard drawout apparatus.

An additional object of the present invention is to provide electrical joint apparatus of the above character, which is operable to simultaneously make plural electrical joints from a removed, safe location.

A further object of the present invention is to provide joint apparatus of the above character, which is operable to make plural reliable electrical joints in highly repeatable fashion.

Yet another object of the present invention is to provide joint apparatus of the above character capable of perfecting electrical joints having all the characteristics and attributes of bolted joints.

An additional object is to provide electrical joint apparatus of the above character which is efficient in design and conveniently manually operable in a rapid fashion.

Other objects of the invention will in part be obvious and in part appear hereinafter.

SUMMARY OF THE INVENTION

In accordance with the present invention, there is provided electrical joint apparatus of high current carrying capacity having particular but not limited application in switchboard drawout apparatus. The joint apparatus of the invention provides the unique capability of manually perfecting from a safe, removed location cool running electrical joints similar to and having the attributes of bolted joints. Moreover, the apparatus is effective in perfecting a plurality of such electrical joints simultaneously in a simple, rapid and reliable manner. In addition, a signal feature of the present invention resides in its capability of generating predetermined and uniformly repeatable joint clamping forces, thus achieving highly reliable electrical joints each time they are made. Also of prime significance and advantage is the fact that the joint apparatus of the invention generates equal and oppositely directed clamping forces on the individual joints and consequently there is no resultant force acting on the joint apparatus once the joints have been perfected.

More specifically, the joint apparatus of the present invention includes an array of spaced first electrical connectors, each equipped with plural contact elements arranged in parallel spaced relation. Also included in an array of second electrical connectors, each associated with a different one of the first connectors and having at least one contact element arranged for juxtaposition in lapped relation with the contact elements of its associated first connector. An elongated clamping rod extends freely through aligned apertures in the contact elements of each of the first electrical connectors and has affixed to one of its ends a first cam follower. A second cam follower is movably mounted on the rod adjacent its one end in juxtaposed relation with the first cam follower. First compression spring means is interposed between the second cam follower and the first connector at one end of the array, while second compression spring means is interposed between the first connector at the other end of the array and a stop affixed to the other end of the rod.

Camming means is provided for driven movement between joint clamping and joint unclamping positions. The camming means while in its unclamping position engages the first and second cam followers such as to sustain the first and second compression spring means in substantially unloaded conditions and thus permit the contact elements of associated first and second connectors to readily move into and away from lapped relation. However, when the camming means is driven to its clamping position, the first and second cam followers are cammed in opposite directions to uniformly load the first and second compression spring means and thereby develop substantially equal and oppositely directed forces effective to clamp the lapped contact elements in secure electrical interconnection.

The electrical joint apparatus of the invention further includes insulators supported on the rod and filling the spaces between adjacent first connectors, such as to achieve electrical isolation therebetween and also to serve as joint clamping force transmitting elements. Additional insulators electrically isolate the connectors from the rod and the cam followers, and thus the camming means can be manually propelled between its clamping and unclamping positions directly or remotely via a drive train in complete safety.

The disclosed embodiment of the present invention specifically directed to implementation in switchboard drawout apparatus includes separate arrays of first connectors and separate arrays of second connectors. Each first connector array is equipped with a clamping rod, compression spring means and cam followers, all as generally described above. The camming means is in the form of separate, rigidly interconnected double acting cams positioned to engage the cam followers of each first connector array during conjunctive movement between the clamping and unclamping positions. Thus, a common manual drive is effective to propel the separate cams in unison to their joint clamping positions pursuant to simultaneously generating equal and oppositely directed clamping forces in each first connector array and the plural joints in each of the associated first and second connector arrays are achieved concurrently in an efficient and reliable manner.

The invention accordingly comprises the features of construction and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 5 is a fragmentary perspective view of a portion of the drawout apparatus of FIG. 1 mounted by the switchboard;

FIG. 7 is a fragmentary, perspective view of a portion of a joint clamping mechanism incorporated in the drawout apparatus of FIG. 1;

FIG. 9 is an exploded, perspective view of a portion of the joint clamping mechanism of FIG. 7;

FIG. 10 is a fragmentary, perspective view of a portion of the joint clamping mechanism of FIG. 7 depicted in its joint clamping condition;

FIG. 11 is a fragmentary, plan view, partially broken away, of a portion of the joint clamping mechanism of FIG. 7;

FIG. 12 is a plan view, partially broken away, of a portion of the joint clamping mechanism of FIG. 7, depicted in its joint clamping condition;

FIGS. 16 through 19 are a series of perspective views of the access control assembly in its various conditions to control access to the racking and joint clamping mechanisms;

FIGS. 26 and 27 are plan views, partially broken away, of a portion of the drawout apparatus of FIG. 1 illustrating the manner in which a trip interlock assembly and the position indicator assembly of FIGS. 20 through 23 are controlled by the joint clamping mechanism of FIG. 7;

FIGS. 28 and 29 are sectional views of the trip interlock assembly of FIGS. 26 and 27, illustrating the manner in which the trip interlock assembly is controlled by the racking mechanism of FIGS. 3 and 4; and FIG. 30 is an exploded, fragmentary perspective view of a portion of the trip interlock assembly of FIGS. 26 and 27.

Corresponding reference numerals refer to like parts throughout the several views of the drawings.

DETAILED DESCRIPTION

Figure 1:
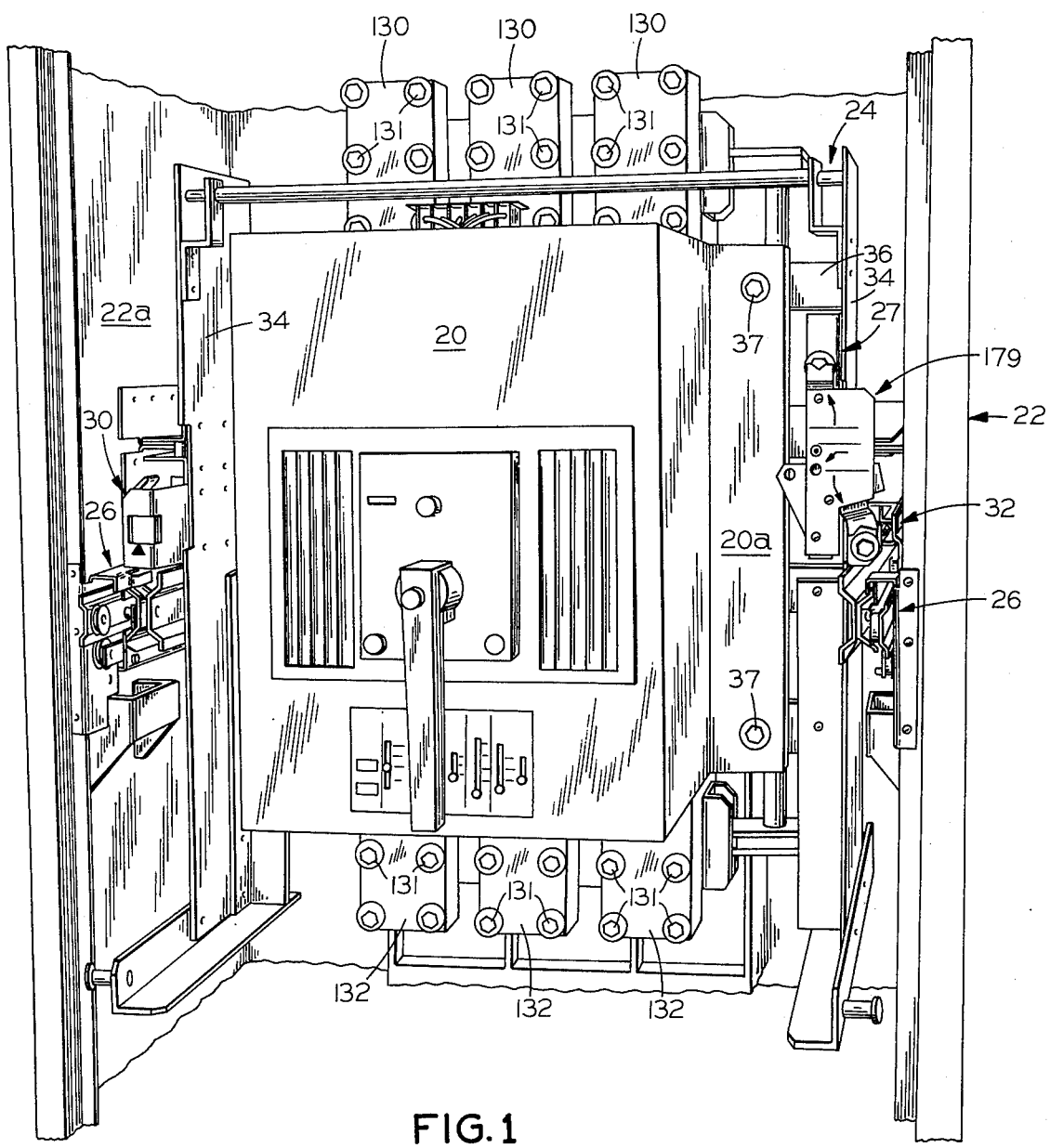
FIG. 1 is a front perspective view of a switchboard compartment equipped with circuit breaker drawout apparatus embodying the present invention.

Referring first to FIG. 1, the invention is embodied in a drawout apparatus for facilitating racking movement of a large, industrial-type circuit breaker 20 into and out of a cubical or compartment of an electrical enclosure or switchboard 22. The circuit breaker is mounted by a carriage, generally indicated at 24, which in turn is supported for racking movement by opposed telescoping rail assemblies, generally indicated at 26 and mounted to the compartment sidewalls 22a. The rail assemblies are preferably constructed in the manner disclosed in the commonly assigned, co-pending application Ser. No. 565,618, filed Apr. 14, 1975; the disclosure of this co-pending application being specifically incorporated herein by reference. These rail assemblies accommodate racking movement of circuit breaker 20 between a withdrawn or extended position and a retracted or "engaged" position, wherein the breaker-switchboard load current carrying primary contact terminals are in engageable relation, ready to be made into cool running joints by a clamping mechanism generally indicated at 27. As disclosed in the above-noted co-pending application, the rail assemblies accommodate positioning of the circuit breaker in an intermediate position, commonly referred to as the "test" position, wherein the primary contact terminals are disengaged, while circuit breaker-switchboard secondary contacts remain engaged to permit operational testing of various assessorial or auxiliary functions embodied in the circuit breaker. Intermediate the extended and test positions is a so-called "disengaged" position wherein both the primary and secondary contacts are disengaged. These engaged, test and disengaged positions of the circuit breaker are displayed frontally to the operator of the drawout apparatus by an indicator assembly, generally indicated herein at 30 in FIG. 1. Racking movement of the circuit breaker between its extended and test positions is readily effected manually through the convenience of the rail assemblies 26. However, in order to achieve precise positioning of the circuit breaker in its engaged and test positions, racking movement therebetween is effected by operation of a racking mechanism, generally indicated at 32 in FIG. 1.

Figure 2:
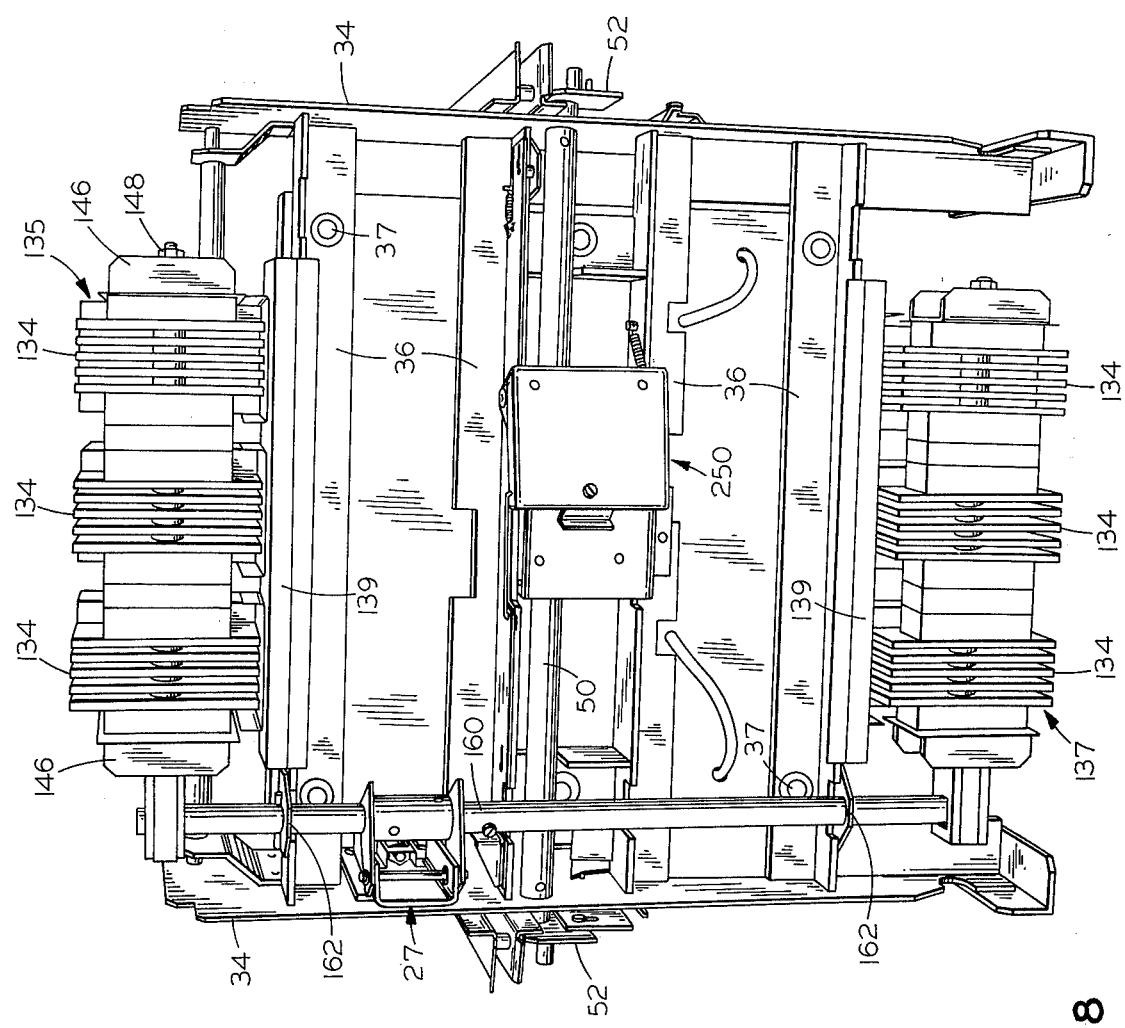
FIG. 2 is a rear perspective view of the drawout apparatus of FIG. 1.
Figure 3:
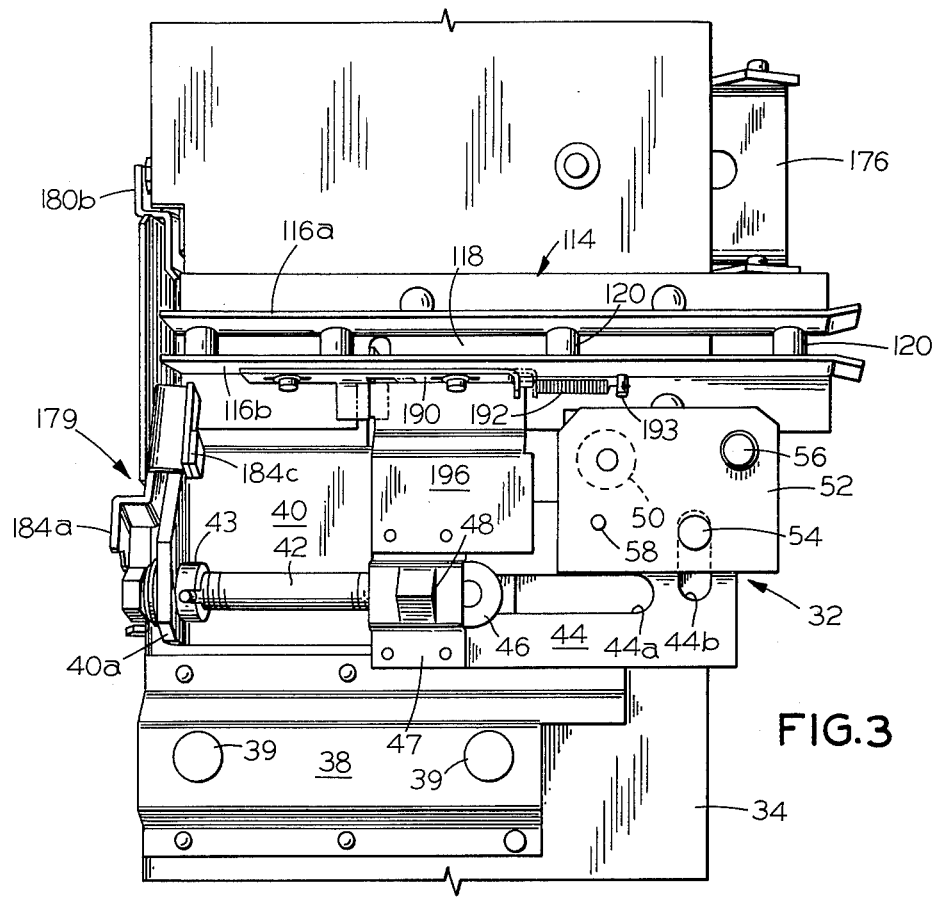
FIGS. 3 and 4 are side elevational views of a circuit breaker carriage utilized in the drawout apparatus of FIG. 1, these figures portraying the operation of a racking mechanism included in the drawout apparatus.
Figure 4:
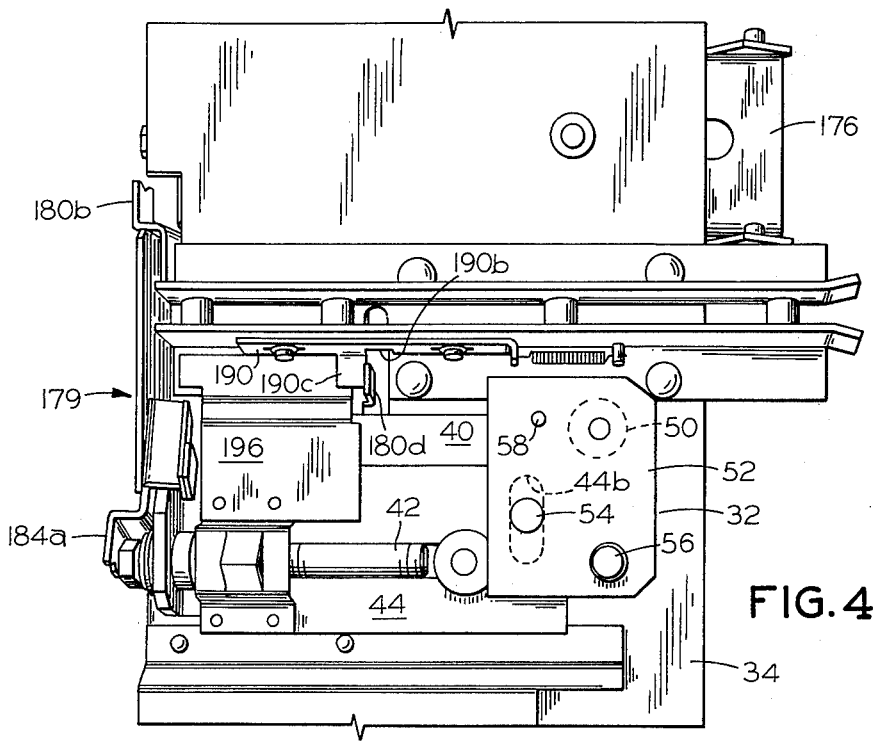

Carriage 24, as seen in FIGS. 1 and 2, includes a pair of spaced sideplates 34 interconnected across the back by a series of horizontal stringers 36. Bolts 37 clamp laterally extending flanges 20a, integral with the circuit breaker base, to the carriage stringers 36 pursuant to affixing the circuit breaker to the carriage. As best seen in FIG. 3, a horizontally elongated bracket 38 is affixed to each sideplate 34 for the purpose of mounting front and rear carriage support pins 39. As disclosed in the above-noted co-pending application, these pins are received in slots provided in the inner rails of each rail assembly in mounting the circuit breaker-carriage assembly thereon. As seen in FIGS. 3 and 4 herein, a mounting plate 40, affixed to the right carriage sideplate 34, is formed with a turned out frontal flange 40a which serves to rotatably mount a lead screw 42 included in racking mechanism 32. A collar 43, fitted on lead screw 42 behind flange 40a, cooperates with the lead screw head to preclude axial movement of the lead screw. A slideplate 44 is provided with a longitudinally elongated slot 44a which receives a laterally outstanding pin 46 carried by mounting plate 40. A bracket 47 is affixed to slideplate 44 and captures a travelling nut 48 through which lead screw 42 is threaded. It is seen that slideplate 44 is thusly mounted to reciprocate horizontally as the lead screw is rotated in opposite directions via a suitable tool, such as a conventional socket wrench.

Racking mechanism 32 further includes a crank shaft 50 (FIG. 2) extending across the back of the circuit breaker and journalled adjacent its ends in carriage sideplates 34. To the ends of the crank shaft are affixed right and left crank arm 52. The right crank arm as seen in FIGS. 3 and 4, carries an inwardly extending pin 54 which is received in a vertically elongated slot 44b in slideplate 44. It is thus seen that reciprocation of slideplate 44 by rotation of lead screw 42 swings the right crank arm 52 through an arc centered about the crank shaft axis via the pin 54 and slot 44b interconnection. Thus, rotation of the lead screw 42 in a direction to move the slide to the left from its position in FIG. 3 to its position in FIG. 4 swings the right crank arm 52 in the clockwise direction. Crank shaft 50 is thus also rotated in the clockwise direction, and the left crank arm affixed to its other end is swung through a corresponding arc. The crank arms mount outwardly extending crank pins 56 which, as described in detail in the above-noted co-pending application, operate on stationary cam surfaces to achieve racking movement of the circuit breaker-carriage assembly between the test and engaged positions via operation of racking mechanism 32.

Each rail assembly, as seen in FIG. 5, includes two sets of vertically opposed rollers 62 which are mounted to the compartment sidewall 22a. These rollers serve to movably mount an intermediate rail 64 which, in turn, mounts a series of rollers 66. These rollers, in turn, movably mount an inner rail 70. It is thus seen that the intermediate rail rides on stationary rollers 62, while the inner rail 70 rides on rollers 66 carried by the intermediate rail, thus accommodating telescopic movement of the two rails of each rail assembly in and out. To mount carriage 24 to the rail assemblies, each inner rail 70 is provided with front and rear upwardly opening notches 72 which receive the carriage support pins 39 (FIG. 3).

As disclosed in the above-noted co-pending application Ser. No. 567,618, the rail assemblies 26 include provisions for limiting the telescopic movements of the intermediate and inner rails, locking the carriage in its supported position on the rail assemblies, and latching means for latching the rail assemblies in their extended and compacted conditions in the absence of the circuit breaker carriage. Also, the rail assemblies are structured such that the circuit breaker-carriage assembly may be swung over on the two forward carriage support pins 39 to an inverted orientation, thereby facilitating inspection and maintenance of the circuit breaker and switchboard primary contact terminals.

Figure 6:
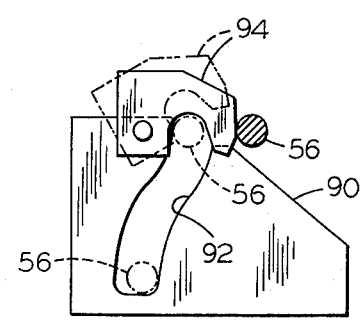
FIG. 6 is a fragmentary, somewhat diagramatic, side elevational view of a portion of FIG. 5, illustrating the action of a gate in controlling the racking movement of the circuit breaker-carriage assembly between its test and disengaged position.

That portion of the racking mechanism 32 carried by carriage 24, namely the racking screw 42, slideplate 44, crank arms 52, crank pins 56 etc. have already been described in connection with FIGS. 3 and 4. The remaining, stationary portion of the racking mechanism is supported by each compartment sidewall 22a. Thus, as seen in FIG. 5 and as described in detail in the above-noted co-pending application, a plate 90, affixed to each compartment sidewall, is provided with a double-acting cam slot 92 extending from an upwardly directed mouth downwardly and somewhat rearwardly. Crank pins 56 (FIGS. 3 and 4) operate in these cam slots as illustrated in FIG. 6; acting on the forward edges thereof to draw the circuit breaker-carriage assembly from the test position inwardly to the engaged position and acting on the rearward edges thereof to draw the assembly back to the test position. This action is implemented by rotation of the racking mechanism lead screw 42 in one direction to swing the crank pins downwardly in slots 92 and draw the circuit breaker into the engaged position and by rotation in the opposite direction to swing the crank pins upwardly in the slots to back the circuit breaker off to the test position.

Entry and exit of the crank pins 56 from their associated cam slots 92 are controlled by pivotally mounted gates 94. Positioning of each gate 94 is manually controlled by a separate, elongated gate operator arm 98 extending out to the front side edge of the switchboard compartment. As described more clearly in the above-noted co-pending application, arms 98 are pulled out in order to pivot the gates 94 to their open position seen in FIG. 5 and in phantom in FIG. 6. Latches 100 are provided to hold the operator arms in their pulled out positions against the bias of return springs 101, such as to sustain the gates in their open positions and thus accommodate movement of the crank pins 56 into the mouths of cam slots 82 as the circuit breaker-carriage assembly is manually pushed in from the disengaged position to the test position. Latches 100 also sustain the gates in their open positions to accommodate exiting of the crank pins 56 as the circuit breaker-carriage assembly is manually pulled away from the test position into the disengaged position. The latches 100 are also equipped to automatically release the arms 98 for retraction by springs 101 to close the gates 94 once the crank pins 56 have either entered or left the mouth of cam slots 92. To this end, the latches 100 are provided with rearward extensions 112. When the latches are positioned to latch the arms 98 in their pulled out positions, the extensions are elevated into positions where they are engaged by a gate actuating pin 58 (FIGS. 3 and 4) carried by each crank arm 52 as the circuit breaker-carriage assembly makes its final approach into the test position and as the assembly exits the test position enroute to the disengaged position. This engagement unlatches the latches to release the arms, and the gates close, all as more clearly described in the above-noted co-pending application Ser. No. 565,618.

To prevent undesirable rocking and skewing of the circuit breaker-carriage assembly during its racking movement, a longitudinally elongated guide channel, generally indicated at 114 in FIGS. 3 and 4, is affixed to each carriage sideplate 34. Each guide channel consists of vertically spaced, laterally extending flanges 116a and 116b. The channel 118 defined by these flanges is bottomed by a series of spaced posts 120. As seen in FIG. 5, a longitudinally elongated guide flange 122 is mounted to each compartment sidewall 22a. Guide flange 122 is made up of two flange halves between which are captured a series of rollers 124. During racking movement of the circuit breaker-carriage assembly, guide flange 122 is received in the guide channel 118 with rollers 124 rolling against the upper and lower channel defining flanges 116a, 116b to prevent rocking motion of the circuit breaker-carriage assembly during racking movement without adding noticably to the required racking force. Posts 120 situated in the bottoms of the guide channels 118 engage the free edges of guide flanges 122 so as to inhibit appreciable skewing motion of the circuit breaker-carriage assembly during racking movement.

Figure 8:
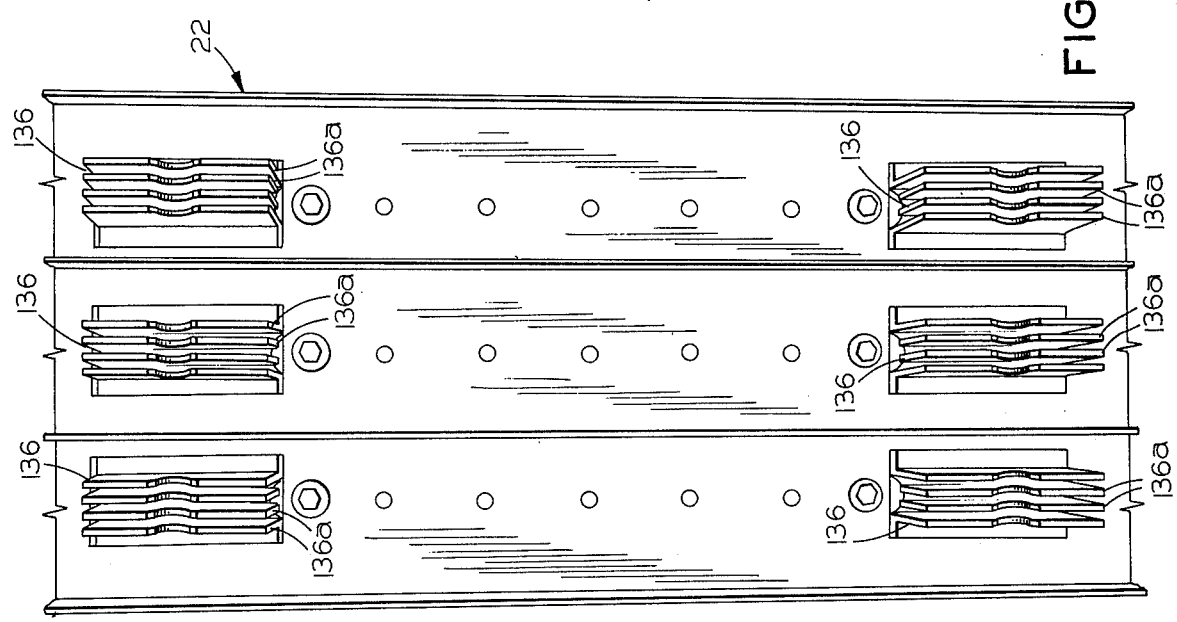
FIG. 8 is an isometric view of the back wall of the switchboard cubical accommodating the drawout apparatus of FIG. 1.

Returning to FIGS. 1 and 2, circuit breaker 20 is provided with massive line terminal straps 130 extending upwardly from the breaker case and a plurality of downwardly extending load terminal straps 132. To each line terminal strap there is clamped in electrical connection, by means of bolts 131, a separate stab connector 134 (FIG. 2). Similarly, bolts 131 secure individual stab connectors 134 to each of the load straps 132. As will be seen, the line stab connectors are ganged together to provide a line connector stack assembly 135, while the load stab connectors are ganged together to provide a load connector stack assembly 137; both assemblies being included in the joint clamping mechanism 27. As best seen in FIG. 7, each stab connector 134 comprises a base 134a which is provided with tapped bores into which the bolts 131 are threaded pursuant to clamping the connector in electrical connection with its associated terminal strap. Integrally formed with connector base 134a are a plurality of parallel spaced contact fingers 134b. As seen in FIG. 8, the switchboard 22 is equipped with line and load receiver connectors 136 respectively electrically connected to line and load bus (not shown). These switchboard line and load receiver connectors are similarly provided with a series of parallel spaced contact fingers 136a. Returning to FIG. 7, when the circuit breaker-carriage assembly is in the engaged position, the contact fingers of the associated circuit breaker stab connectors and switchboard receiver connectors interleave. The spacings between the contact fingers of the associated stab and receiver connectors are such that they slide freely relative to each other in assuming their interleaved relationships. Preferably, the line and load stab connectors are individually secured to elongated insulative bars 139 affixed to the carriage stringers 36 as best seen in FIG. 2, and thus the line and load connector stack assemblies may be supported as completed assemblies by the carriage 34, independently of the circuit breaker terminal straps.

Referring jointly to FIGS. 7 and 9 through 12, the contact fingers 134b of each of the identically constructed line and load connector stack assemblies 135, 137 are provided with transversely registered apertures 134c through which extends an elongated clamping rod 140 (FIG. 11). An insulating sleeve 142 encompasses the clamping rod 140 so as to electrically insulate the rod from the individual contact fingers. Centrally apertured insulator blocks 144 are loosely fitted on clamping rod 140 to take up the space between adjacent stab connectors 134. Similar, centrally apertured insulator blocks 144 are loosely received on each end portion of clamping rod 140 beyond the outboard stab connectors 134. The left end of clamping rod 140 passes through a central opening in a U-shaped clamping plate 146 and terminates in a threaded portion accommodating a nut 148. Captured on the left end of clamping shaft 140 intermediate nut 148 and clamping plate 146 are a series of four Belleville washers 150. A sheet 151 of insulation is interposed between clamping plate 146 and the left most insulator block 144 so as to increase the over surface clearance between the outboard connector and the metal part therebeyond.

The right end of clamping rod 140 of each connector stack assembly passes through another U-shaped clamping plate 146, an insulative sheet 151, and a series of four Belleville washers, terminating in a tongue 152 having formed therein a rectangular opening 152a, as best seen in FIG. 9. A U-shaped clamping element 154 is formed having an aperture 154a in its bight portion 154b through which the right end clamping rod 140 freely passes. The legs 154c of clamping element 154 are spaced apart sufficiently to receive therebetween tongue 152 at the right end of clamping rod 140. Rectangular openings 154d are provided in the clamping element legs 154c in opposed relation with rectangular opening 152a in tongue 152.

As best seen in FIG. 2, a vertically oriented clamping shaft 160, also included in the joint clamping mechanism 27, is journaled for axial rotation by brackets 162 affixed to the upper and lower carriage stringers 36. The upper and lower terminal portions of this clamping shaft are provided with opposed flats 160a (FIG. 9), with these terminal portions extending through the rectangular openings in the clamping element 154 and tongue 152 of both line and load connector stack assemblies 135, 137. In the quiescent condition of joint clamping mechanism 27, clamping shaft 160 is angularly oriented as seen in FIG. 7, such that the flats 160a at its terminal end portions are arranged perpendicular to the axis of clamping rod 140. Thus, these flats engage the outer edges of the rectangular openings 152a in tongues 152 and the inner edges of rectangular openings 154d in clamping elements 154.

Still considering the joint clamping mechanism 27, a bracket 170 is atached to the inner side of the right carriage sideplate 34, as seen in FIG. 11. The forward portion of this bracket is laterally turned to provide a flange 170a for rotably mounting a lead screw 172. A collar 174 fitted to lead screw 172 behind flange 170a prevents axial movement of the lead screw. A sideplate 176 is mounted for reciprocating movement by a bracket mounted pin 177 received in a longitudinally elongated slot 176a visible in FIG. 16. The slideplate captures a traveling nut 178 through which lead screw 172 is threaded. A transversely elongated slot 176b formed in slideplate 176 receives a pin 180 carried at the free end of a crank arm 182 affixed at its other end of clamping shaft 160, as best seen in FIG. 9. It is thus seen that rotation of clamping screw 172 via a suitable tool, such as a socket wrench, reciprocates slide 176, which in turn, via crank arm 182, rotates clamping shaft 160.

With the contact fingers of the switchboard receiver connectors and the line and load connector stack assemblies interleaved, rotation of the clamping shaft 160 swings the rounded portions of its shaft terminations into engagement with the opposed edges of the rectangular openings in the tongues 152 and clamping elements 154 of both stack assemblies. As a result, tongues 152 are cammed to the right as seen in FIG. 10, pulling with it clamping rod 140 and thereby loading the Belleville washers 150 at the left ends of both the line and load connector stack assemblies. At the same time, clamping elements 154 are cammed to the left as seen in FIG. 10 to load the Belleville washers 150 at the right ends of the line and load connector stack assemblies. These Belleville washers at each end of the joint stack assembly develop oppositely directed clamping forces effective to clamp the interleaved contact fingers of the circuit breaker stab and switchboard receiver connectors in secure electrical connection.

While the joint clamping mechanism together with its line and load connector stack assemblies are disclosed as being mounted by the carriage, it will be appreciated that this mechanism could be mounted instead by the switchboard. Preferably, the stab connectors 134 are each provided with one more contact finger 134b than is provided in each of the receiver connectors 136, as illustrated herein, and consequently the stab contact fingers can effectively define all of the slots into which the receiver contact fingers 136a are inserted.

It will be appreciated that the disclosed joint clamping mechanism offers numerous advantages. The designed differential in the effective diameters of the clamping shaft flats 160a versus the rounded portions of the shaft terminations is operative to impart a predetermined and very repeatable loading or compression of the sets of Belleville washers at each end of both stack assemblies. Thus, the clamping forces developed by the opposed sets of spring washers are equally predetermined and repeatable. Since these clamping forces are essentially equal and oppositely directed, there is no significant resultant forces acting on the connector stack assemblies. Joint clamping forces of as much as 3,000 pounds have been achieved utilizing the disclosed joint clamping mechanism. The nuts 148, threaded on the ends of the clamping rods 140, are turned to readily establish the desired clamp force magnitude. While Belleville washers are illustrated herein, it will be understood that other forms of joint clamping force generating springs may be utilized. Also to be noted is the fact that the disclosed joint clamping mechanism affords the opportunity to perfect high current carrying primary terminal joints from the front of the switchboard in complete safety even while the switchboard line receiver connectors are live. Moreover, all phases of both the line and load primary terminal joints are perfected concurrently in convenient fashion, with the joints having all the attributes of bolted joints. While the joint clamping mechanism is herein disclosed in its applicatin to effecting electrical joints between a switchboard and an electrical device, it will be appreciated that the teachings may be readily applied to the making of high current carrying electrical joints in general, such as between busway sections and between busway and busway plugs.

As a safety measure, it is deemed appropriate to interlock the operations of the racking mechanism 32 and the joint clamping mechanism 27, depending upon the position of the circuit breaker-carriage assembly. That is, it is very important that the clamping screw 172 not be rotated to exert clamping pressures on the line and load connector stack assemblies until the circuit breaker is in its engaged position with the contact fingers of the stab and receiver connectors fully interleaved. It will be appreciated that permanent deformation of the circuit breaker stab connector fingers could well result if clamping pressure is exerted absent the interleaved switchboard receiver contact fingers. Also, interleaving of the contact fingers could not be achieved as the circuit breaker is racked into its engaged position if the connector stack assemblies were pre-clamped, and attempts to do so would damage the racking mechanism 32. By the same token, attempts to rack the circuit breaker-carriage assembly away from its engaged position without first unclamping the joint stack assemblies could also damage the racking mechanism.

Figure 13:
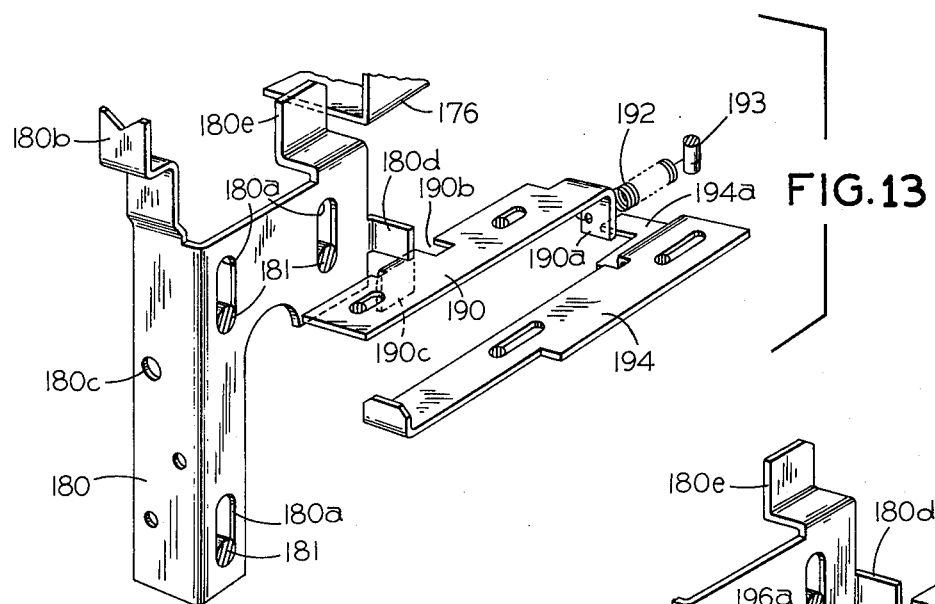
FIG. 13 is an exploded, perspective view of a portion of an access control assembly incorporated in the drawout apparatus of FIG. 1.
Figure 14:
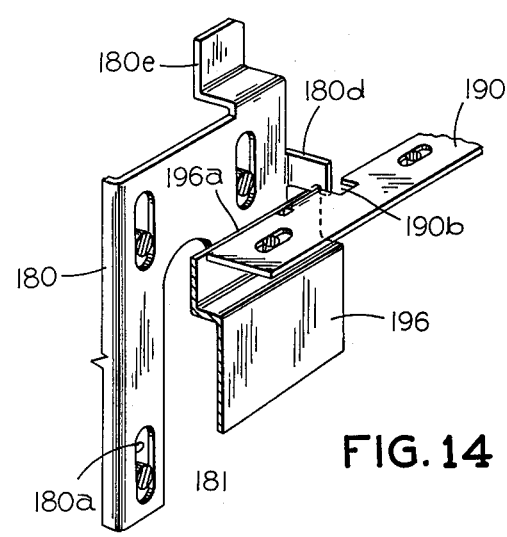
FIG. 14 is a perspective view of a portion of the access control assembly of FIG. 13, illustrating different relative positions of the various parts.
Figure 15:
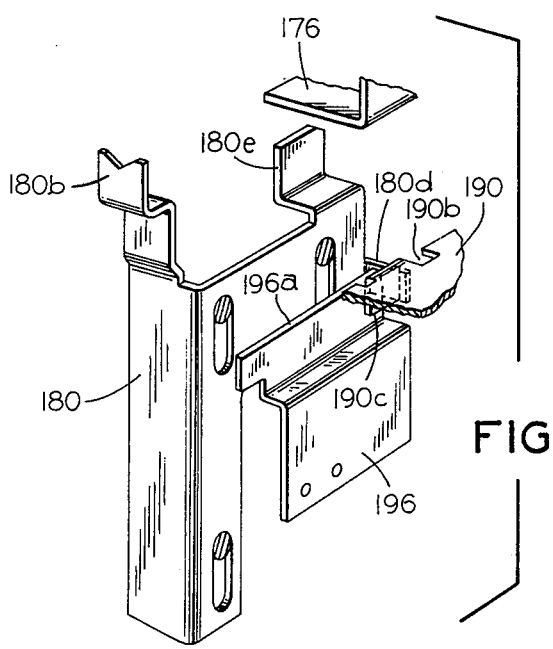
FIG. 15 is a fragmentary, perspective view of the access control assembly of FIG. 13, illustrating the relative positions of the various parts assumed when the circuit breaker-carriage assembly arrives at its enngaged position.

To this end, an access control assembly, generally indicated at 179 in FIGS. 1 and 16 through 19, is provided to include a first access control plate 180 having vertically elongated slots 180athrough which are received pins 181 pursuant to vertically reciprocatively mounting the plate to the inner side of the right carriage sideplate 34 as best seen in FIGS. 13 through 15. This access control plate further includes an offset and upwardly extending barrier 180b which, with the plate in its elevated position, partially overlies the head clamping screw 172, thus denying access thereto. Riveted to access control plate 180 is a faceplate 182, which is provided with a lower offset tab 182ato serve as a handle for manually vertically positioning the access control assembly 179. A second access control plate 184 is mounted by a pivot pin 185 between the first access control plate 180 and faceplate 182. The second access control plate 184 is provided with an offset and depending barrier 184a which is adapted to control access to the head of racking screw 42, depending upon the vertical position of the access control assembly and the angular position of the second access control plate. A spacer rivet 186 extending between faceplate 182 and access control plate 180 through an elongated slot 184b in the second access control plate 184 (FIG. 17) holds these plates is spaced relation to accommodate plate 184. A clamping screw 187 is adjusted to squeeze the two outer plates together so as to exert a light frictional drag on the pivotal movement of the second access control plate and thus discourage spurious pivotal movement of access control plate 184 during vertical reciprocation of the access control assembly 179.

From the description thus far, it is seen that while the second access control plate 184 is in its counterclockwise most pivotal position seen in FIG. 16, its barrier 184a is in position to deny access to the racking or drawout screw 42 while the access control assembly 179 is in its depressed position. However, barrier 180b is the ducked away from the head of clamping screw 172 such as to afford access thereto. When the access control assembly is in its elevated position seen in FIG. 19, barrier 180b is in position to deny access to clamping screw 172, while barrier element 184a is elevated away from the head of racking screw 42 to admit access thereto. With the access control assembly in its elevated position and the control plate 184 pivoted to its clockwise-most position as illustrated in FIG. 17, access to both racking screw 42 and clamping screw 172 is denied. In this condition, aperture 182b in faceplate 182, aperture 184d in control plate 184, and aperture 180c in control plate 180 (FIG. 13) are in registry to receive the hasp of a padlock 188.

To interlockingly regulate the movement of the access control assembly according to the circuit breaker-carriage assembly position, a slide 190 is mounted to the underside of the lower guide channel flange 116b (FIGS. 3, 4 and 13 through 15) for limited fore and aft movement. A spring 192, operating between a turned down tab 190a at the rear end of slide 190 and a post 193 depending from guide channel flange 116b, biases the slide to its rearward postition. An arm 194 adjustably mounted to the underside of guide flange 122 (FIGS. 5 and 13), carries a laterally extending tab 194a which is positioned to engage a turned down tab 190a, shifting slide 190 to its forward position as the circuit breaker-carriage assembly is racked to its engaged position. The forward end of arm 194 is turned up to provide a convenient handle for adjusting the mounting position of the arm such that slide 190 is shifted sufficiently forward upon arrival of the circuit breaker-carriage assembly in its engaged position to register a notch 190b formed therein with a laterally turned tab 180d carried by access control plate 180. A tab 190c depending from slide 190 just forward of notch 190b, prevents access control plate tab 180d from getting caught under the slide. Once the appropriate position of arm 194 is established, it is immovably clamped to the underside of guide flange 122. It is seen from FIG. 13, that until slideplate 190 is shifted to its forward position by engagement with arm tab 194a upon arrival of the circuit breaker in its engaged position, notch 190b is out of registry with tab 180d, and access control assembly 179 cannot, under this circumstance, be shifted downwardly to afford access to clamping screw 172.

As an additional precautionary measure, a flange 196 is riveted to the racking screw slideplate 44, as seen in FIGS. 3, 4, 14 and 15. The upper elongated edge 196a of this flange is positioned in underlying relation to access control plate tab 180d, as to prevent downward movement of the access control assembly until the racking mechanism has been operated to draw the circuit breaker-carriage assembly into the engaged position. Once in the engaged position, flange 196 has moved completely forward of the access control plate tab 180d, as seen in FIGS. 4 and 15, thus clearing tab 180d to move downwardly through notch 190b and beyond the back edge of flange 196. These two separate, but functionally related interlocking provisions are seen to prevent inadvertant, untoward operation of the joint clamping mechanism, both while the circuit breaker-carriage assembly is mounted or dismounted with respect to the rail assemblies 26.

With the circuit breaker-carriage assembly in its engaged position and the access control assembly freed to be shifted downwardly to access the clamping screw while, at the same time, denying access to the racking screw, clamping operation of the connector stack assemblies then may proceed. As the clamping mechanism slideplate 176 is drawn forwardly by rotation of clamping screw 172, it moves over an upstanding tab 180e carried by access control plate 180 (FIGS. 15 and 16) so as to prevent elevation of the access control assembly during the time that clamping pressures are being exerted on the connector stack assemblies, and consequently, access to the racking screw 42 is, under this circumstance, denied.

It is preferred that the access control assembly can only be locked by padlock 188 when the circuit breaker-carriage assembly is in either its test or engaged positions. To this end, the pivotal access control plate 184 is provided with a laterally extending tab 184c which is received in one of two sets of notches 200a and 200b formed in the upper edges of both the right gate control arm 98 and a bracket 202 supporting same, as seen in FIGS. 5, 16 and 17. These notches are positioned such that the set 200a is aligned with tab 184c when the circuit breaker-carriage assembly is in its test position and the set 200b is aligned with the tab when the assembly is in its disengaged position. For the engaged position of the assembly, tab 184c is not registerable with either of these notch sets, and consequently access control plate 184 cannot be pivoted sufficiently clockwise to align its hasp aperture 184d with the hasp apertures in the faceplate and access control plate 180 such as to permit padlocking. However, with tab 184c lodged in either of the notches sets 200a, 200b and the padlock applied, racking movement of the circuit breaker-carriage assembly and operation of the gate control arm are both precluded, and the access control assembly is locked in the condition denying access to both lead screws 42 and 172.

The present drawout apparatus includes position indicating apparatus similar to that disclosed and claimed in the commonly assigned, co-pending application Ser. No. 567,619, filed Apr. 14, 1975. In the drawout apparatus of this co-pending application, there were only three significant circuit breaker-carriage positions, namely, the disengaged, test and engaged positions. In the instant drawout apparatus, there is an additional position, which is in actuality a condition, namely, the joint clamped position. In terms of circuit breaker-carriage assembly position, the engaged and clamped positions are the same. The clamped postion pertains when the circuit breaker stack connector assemblies are clamped in electrical connection with the switchboard receiver connectors. Accordingly, the position indicating apparatus 30 of the pesent drawout apparatusis structured so as to indicate not only the disengaged, test and engaged positions of the circuit breaker-carriage assembly, but also the clamped condition of the circuit breaker-switchboard primary contact terminals.

Figure 20:
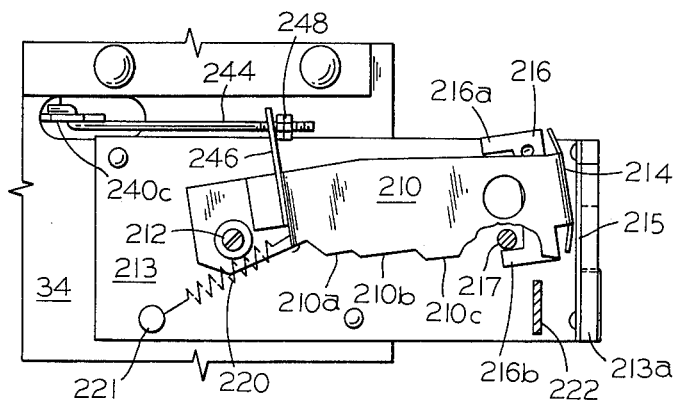
FIGS. 20 through 23 are a series of side elevational views illutrating the operation of a position indicator assembly utilized in the drawout apparatus of FIG. 1.
Figure 25:
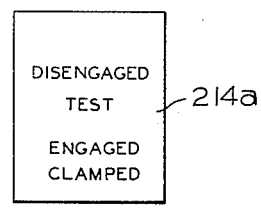
FIG. 25 is a plan view of a position indicia bearing label displayed by the position indicator apparatus of FIGS. 20 through 23.
Figure 24:
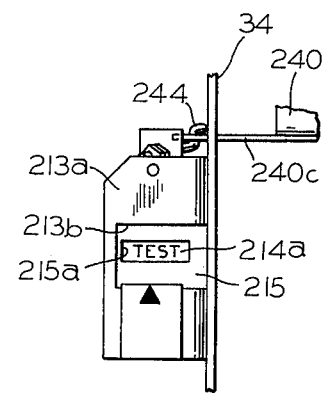
FIG. 24 is a front elevational view of the position indicator apparatus of FIGS. 20 through 23.
Figure 23:
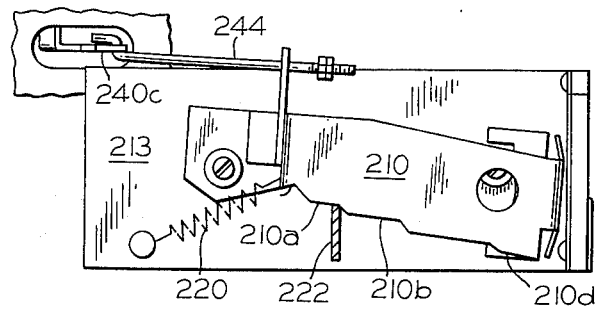

To this end, the position indicator assembly 30 includes, as seen in FIGS. 20 through 23, an arm 210 pivotally mounted at 212 to a bracket 213 affixed to the left carriage sideplate 34. The forward portion of arm 210 is laterally offset away from bracket 213 and terminates in a bent flag 214 to which is affixed label 214a (FIG. 25) bearing the words Disengaged, Test, Engaged and Clamped, one below the other. A laterally turned front end portion 213a of bracket 213 is provided with a rectangular opening 213b (FIG. 24) behind which is affixed a mask 215 having a window 215a in which the label indicia is separately displayed. A flange 216 turned back from the side edge of flag 214 opposite its junction with arm 210 carries an upper stop 216a and a lower stop 216b which engage a stop pin 217 carried by bracket 213 to determined the limits of pivotal movement of indicator arm 210, as best seen in FIG. 20. The arm is biased downwardly in the clockwise direction by a spring 220 anchored to a post 221 carried by bracket 213.

As disclosed in the above-noted co-pending application, Ser. No. 567,619, the bottom edge of indicator arm 210 is machined to provide a step cam having a series of straight cam segments 210a, 210b, and 210c and 210d interconnected by sharply angled cam segments 210e. Operating against this step cam is a stationary indicator actuator 222 fixedly mounted by the compartment sidewall. It is thus seen that as the circuit breaker-carriage assembly is moved in and out, the indicator arm 120 is variously angularly positioned depending upon which step cam segment is riding on actuator 222. By correlating the positioning of the indicia on the label 214a affixed to flag 214 with these cam segments, the position of the circuit breaker-carriage assembly can be read through the window 215a in mask 215. Thus, when cam segment 210a is riding on actuator 222 (FIG. 23), the word disengaged is visible in window 215a. As the circuit breaker-carriage assembly is pushed into the test position, cam segment 210b rides onto actuator 222 and arm 210 is pivoted upwardly to index the word test into registry with window 215a. By virtue of the sharply angled transistion cam segment 210e the change in position indication is rather abrupt, occurring essentially upon arrival of the circuit breaker-carriage assembly at its test position. From the test position, the circuit breaker-carriage assembly is drawn toward the engaged position by the racking mechanism 32. Cam segment 210c then rides onto actuator 222, and the indicator arm 210 is pivoted upwardly to register the blank space between the words test and engage in window 215a. This blank indication advises the operator that the circuit breaker-carriage assembly is in neither the test position nor the engaged position, but is in transient therebetween. Upon arrival at the engaged position, cam segment 210d rides onto actuator 222, pivoting arm 210 upwardly still another increment to register the word engaged in window 215a. Though in the engaged position, the circuit breaker must not be turned on until the switchboard-circuit breaker primary contact terminals are clamped in electrical interconnection by operation of joint clamping mechanism 27.

In order to indicate achievement of the clamped condition, the fact of completed operation of the clamping joint clamping mechanism must be communicated to the indicator assembly. To this end, a slide 230, elongated to extend substantially the full width of the carriage 24, is mounted by one of the rear carriage stringers 36, as seen in FIG. 2. More specifically, and as best seen in FIGS. 26 and 27, slide 230 is formed having a series of longitudinally elongated slots 230a in which are received pins 232 carried by the slide supporting stringer 36. This mounting affords limited longitudinal movement of the slide against the force of a spring 236 normally biasing the slide to its right-most position seen in FIG. 27. The left end of this slide seen in FIGS. 26 and 27 mounts a bracket 234 carrying an arm 234a. An adjusting screw 235 threaded through a laterally turned flange portion 234b of bracket 234 bears against arm 234a to adjust its positioning so as to bear against the periphery of clamping shaft 160 when the slide is in its right-most position. Clamping shaft 160 is provided with a bolt 238 extending diametrically through the clamping shaft at an elevation aligned with arm 234a of bracket 234. Upon operation of the joint clamping mechanism to perfect the circuit breaker-switchboard primary contact terminals, clamping shaft 160 is rotated, bringing the head of the bolt around into engagement with arm 234a, as seen in FIG. 26, thereby shifting slide 230 to its left-most position at the conclusion of the joint clamping operation.

Figure 21:
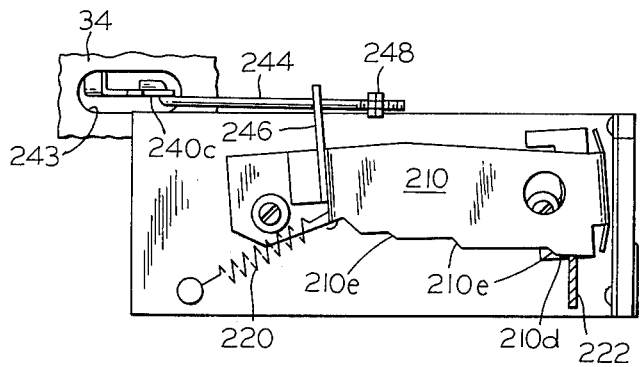
Figure 22:
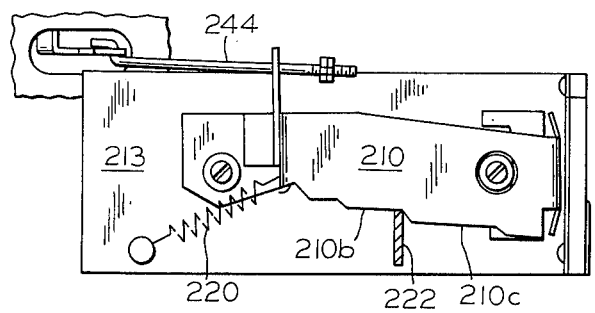

An arm 240 is pivotally mounted at 240a to the slide mounting stringer 36 adjacent the right end of the slide 230 seen in FIGS. 26 and 27 and is provided at one end with an elongated slot 240b in which is received a pin 242 carried by the slide. It is thus seen that the lateral shifting of the slide position produces pivotal movement of arm 240. The other end of arm 240 from post 242 carries a laterally extending tab 240c which extends through an opening 243 in the adjacent carriage sideplate 34. A wire link 244 is hooked at one end to tab 240c of arm 240 and extends through an aperture in a bracket 246 carried by indicator arm 210, as seen in FIGS. 20 through 23. The free end of link 244 is threaded to receive nuts 248 which are adjustably positioned to establish the appropriate length of link 244. In comparing FIGS. 20 and 21, it is seen that with the circuit breaker-carriage assembly in the engaged position and its primary contact terminal joints with the switchboard still to be clamped, cam surface 210d is riding on actuator 222. Upon actuation of the clamping mechanism to its completed joint clamping condition, the bolt head 238 carried by shaft 160 shifts slide 230 to the left as seen in FIG. 26, pivoting arm 240 in a direction to draw the link 244 to the left as seen in FIG. 20, thereby lifting indicator arm 210 upwardly off of actuator 222 sufficiently to register the word clamped in window 215a. As the joint clamping mechanism is operated to relax the joint clamping pressure, clamping shaft 160 rotates to swing the head of bolt 238 away from arm 234a, and slide 230 is returned to the right by its spring 236. Arm 240 is thus pivoted in the opposite direction to shift link 244 to the right as seen in FIG. 21, permitting arm 210 to drop back down onto actuator 222 under the bias of spring 220, thereby again registering the term engaged in window 215a.

In addition to the safety interlocking features provided by the access control assembly 179 operating to control access to the joint clamping mechanism 27 and the racking mechanism 32 depending upon the position of the circuit breaker-carriage assembly, the instant drawout apparatus also includes circuit breaker trip interlocking provisions similar to that disclosed and claimed in the commonly assigned, co-pending application, Ser. No. 567,616, filed Apr. 14, 1975. In this co-pending application, the trip interlock functioned to automatically enable closure of the circuit breaker while in either its test or engaged positions and to automatically trip the circuit breaker, should it be in its ON condition, during initial racking movement from the test position toward the engaged position and from the engaged position toward the test position. Thus the trip interlock functions to insure that the circuit breaker contacts are open during racking movement between the test and engaged positions, so as to preclude the possibility of load current flowing through the plug-in primary disconnect contacts while they are in the process of being engaged and disengaged. In the case of the drawout apparatus disclosed in the present application, circuit breaker trip interlocking, insofar as the test position is concerned, is performed in the manner described in the above-noted co-pending application. However, to defeat the trip interlock upon arrival of the circuit breaker-carriage assembly at its engaged position, as was done in the drawout apparatus of the co-pending application, would create a hazardous situation, since inadvertent closure of the circuit breaker contacts before the circuit breaker-switchboard primary contact terminals have been clamped could have disastrous consequences.

Accordingly, as described below, the trip interlock of the instant drawout apparatus is conditioned by the racking mechanism to permit closure of the circuit breaker contacts while in the test position and to trip the circuit breaker should its contacts be left closed as racking movement is initiated from the test position toward the engaged position. Once in the engaged position, the trip interlock is controlled by the joint clamping mechanism such as to prevent closure of the circuit breaker contacts until the circuit breaker-switchboard primary contact terminals have been completely clamped in electrical interconnection and to trip the circuit breaker should its contacts be closed during initial operation of the joint clamping mechanism toward relaxing the joint clamping pressure.

A trip interlock, generally indicated at 250 in FIGS. 2, 26 and 27, includes bracket 252 affixed by suitable means (not shown) to the same rear carriage stringer which mounts slide 230. This bracket mounts a plunger 254 which is normally biased rearwardly in FIG. 27 or to the left in FIG. 28 by a spring 256. The outer end of plunger 254 is necked down for engagement with an elongated lever 258 pivotally mounted at 259 to bracket 252. The spring 256 is thus effective through plunger 254, to bias the free, right end of lever 258 rearwardly away from circuit breaker 20, as seen in FIG. 27. The inner end of plunger 254 carries a cam follower plate 260 having a crooked end 260a which is urged by spring 256 into engagement with the periphery of crank shaft 50, as best seen in FIG. 28.

An extension 258a of lever 258 is engaged under the head of a screw 262 adjustably threaded into the end of a plunger 264 which is suitably slideably mounted for protrusion through the circuit breaker case into controlling engagement with a circuit breaker tripping element 266. A spring 268 acting between the lever extension arm 258a and plunger 264 accommodates any over travel of the lever 258 in operating the circuit breaker tripping element 266, as occasioned by manufacturing tolerances.

To operate trip interlock 250 off the racking mechanism 32, a bolt 269, mounted transversely through crank shaft 50, is so positioned that its head engages the crooked end 260a of cam follower plate 260 thereby depressing plunger 254 when the racking mechanism accommodates the circuit breaker-carriage assembly to its test position. Depression of plunger 254 pivots lever 258 toward the circuit breaker forcing plunger 264 inwardly, or to the right as seen in FIG. 29, thereby depressing the tripping element 266 to enable closure of the circuit breaker contacts. As the racking mechanism is operated to move the circuit breaker-carriage assembly away from the test position toward the engaged position, the head of bolt 269 carried by crank shaft 50 swings away from cam follower plate 260, and spring 256 returns lever 258 and plunger 264 to their positions shown in FIG. 28. Tripping element 266 is thus released and the circuit breaker is automatically tripped and cannot be reset and closed.

The above described construction and operation of trip interlock 250 are similar to that disclosed in the above-noted co-pending application. However, instead of mounting a second transverse bolt in the crank shaft to actuate the trip interlock upon arrival of the circuit breaker-carriage assembly at its engaged position, the instant trip interlock utilizes a second lever 270 which is operated by slide 230 moving in response to operation of the joint clamping mechanism 27. Thus, as seen in FIGS. 26 and 27, lever 270 is pivotally mounted by a pin 272 affixed to rear carriage stringer 36 through a longitudinally elongated slot 273 in slide 230. A spring 274 normally biases lever 270 in the counterclockwise direction as seen in FIGS. 26 and 27. A wire link 276 interconnects the free end of lever 270 and slide 230 to translate longitudinal movement of the slide into pivotal movement of the lever.

The free end of lever 270 carries an actuating tab 278 poised to engage and depress plunger 254 when lever 270 is pivoted in the clockwise direction by link 276 in response to the slide 230 being shifted to the left as seen in FIG. 26 by the clamping shaft mounted bolt head 238 upon completion of the joint clamping operation. Depression of plunger 254 pivots lever 258 inwardly to achieve depression of plunger 264, which, in turn, depresses tripping element 266 to enable operation of the circuit breaker to its ON condition. As the joint clamping mechanism 27 is operated preparatory to relaxing the joint clamping pressure, bolt head 238 releases slide 230, which is returned to the right by its spring 236. Link 276 thus releases the free end of lever 270, and spring 274 pivots this lever around in the counterclockwise direction, releasing plunger 254. Its return spring 256 then acting through lever 258, retracts plunger 264, releasing the tripping element 266. The circuit breaker is thus automatically tripped, as well as being disabled from being reset and turned on until the joint clamp pressure is fully relaxed and the circuit breaker-carriage assembly backed out to the test position.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. Electrical joint apparatus comprising, in combination:

A. an array of spaced first electrical connectors, each having plural contact elements arranged in parallel spaced relation;

B. an array of second elecrical connectors, each associated with a different one of said first connectors and having at least one contact element arranged for juxtaposition in lapped relation with said contact elements of its associated one of said first connectors;

C. an elongated clamping rod extending freely through apertures in the contact elements of each said first electrical connector;

D. a first cam follower affixed to one end of said rod;

E. a second cam follower movably supported on said rod adjacent said one end thereof in juxtaposed relation with said first cam follower;

F. first compression spring means interposed between said second cam follower and the first connector at one end of said array;

G. a stop affixed to the other end of said rod;

H. second compression spring means interposed between said stop and the first connector at the other end of said array; and I. camming means movable between joint clamping and joint unclamping positions, said camming means while in said unclamping position controllably engaging said first and second cam followers to sustain said first and second compression spring means in substantially unloaded conditions to thereby permit said contact elements of said first and second connectors to move into and away from lapped relation, said camming means operable in said clamping position to cam said first and second followers in opposite directions to uniformly load said first and second spring means such as to develop substantially equal and oppositely directed forces effective to clamp said lapped contact elements in secure electrical interconnection.

2. The electrical joint apparatus defined in claim 1, which further includes insulators supported on said rod, said insulators taking up the spaces between adjacent first connectors.

3. The electrical joint apparatus defined in claim 2, which further includes additional insulators supported on said rod intermediate said first compression spring means and the first connector at one end of said array and intermediate said second compression spring means and the first connector at the other end of said array.

4. The electrical joint apparatus defined in claim 3, which further includes an insulating sleeve carried on said rod to electrically isolate said rod from the contact elements of said first connectors.

5. The electrical joint apparatus defined in claim 4, wherein said stop is adjustably affixed on said rod while said camming means is in said joint clamping position to establish the magnitude of the clamping forces.

6. The electrical joint apparatus defined in claim 3, which further includes a pressure plate carried on said rod and interposed between said first and second compression spring means and said additional insulators at each end of said first connector array.

7. The electrical joint apparatus defined in claim 3, wherein said first and second compression spring means comprises Belleville washers carried on said rod.

8. The electrical joint apparatus defined in claim 3, wherein said first cam follower is formed having a first rectangular aperture, and said second cam follower comprises a U-shaped member including parallel spaced legs joined by a bight having formed therein a clearance hole through which said rod extends to its junction with said first cam follower accommodated between said legs, said legs having formed therein second rectangular apertures disposed on opposite sides said first rectangular aperture, said camming means positioned within said first and second rectangular apertures in camming engagement with the edges thereof.

9. The electrical joint apparatus defined in claim 8, wherein said camming means comprises a double acting cam having opposed arcuate cam surfaces lying on a common circle, said arcuate cam surfaces being separated by opposed flat cam surfaces, said arcuate cam surfaces engaging one edge of said first rectangular aperture and the oppositely situated edges of said second rectangular apertures with said cam in said joint clamping position, and said flat cam surfaces engaging said one edge of said first rectangular aperture and said oppositely situated edges of said second rectangular apertures with said cam in said joint unclamping position.

10. Electrical joint apparatus comprising, in combination:

A. first and second separated arrays of spaced stab electrical connectors, each said stab connector having plural contact elements arranged in parallel spaced relation;

B. first and second arrays of spaced receiver electrical connectors, each said receiver connector of said first array associated with a different one of said stab connectors of said first array and each said receiver connector of said second array associated with a different one of said stab connectors of said second array, each said receiver connector having at least one contact element arranged for juxtaposition in lapped relation with said contact elements of its associated one of said stab connectors;

C. a separate elongated clamping rod extending freely through apertures in the stab connector contact elements of each said first and second stab connector arrays;

D. a first cam follower affixed to one end of each said rod;

E. a second cam follower movably supported on each said rod adjacent said one end thereof in juxtaposed relation with each said first cam follower;

F. first compression spring means interposed between each said second cam follower and the stab connector at one end of each said first and second stab connector arrays;

G. a stop affixed to the other end of each said rod;

H. second compression spring means interposed between each said stop and the stab connector at the other end of each said first and second arrays; and I. camming means movable between joint clamping and joint unclamping positions, said camming means while in said unclamping position controllably engaging said first and second cam followers of each said first and second stab connector arrays to sustain said first and second compression spring means of each said first and second stab connector arrays in substantially unloaded conditions to thereby permit said contact elements of associated stab and receiver connectors to readily move into and away from lapped relation, said camming means operable in said clamping position to cam said first and second cam followers of each said first and second stab connector arrays in opposite directions to concurrently, uniformly load said first and second spring means of each said first and second stab connector arrays such as to develop substantially equal and oppositely directed forces effective to clamp said lapped contact elements of said first and second stab and receiver connector arrays in secure electrical interconnection.

11. The electrical joint apparatus defined in claim 10, wherein said camming means comprises a separate cam acting on the cam followers of each said first and second stab connector arrays, a shaft supporting said cams and spanning the separation between said first and second stab connector arrays, and means for selectively rotating said shaft to concurrently move said cams between said clamping and unclamping positions.

12. An electrical joint apparatus comprising, in combination:
  A. at least one first electrical connector having plural contact elements arranged in generally parallel spaced relation;
  B. a second electrical connector having at least one contact element arranged for juxtaposition in lapped relation with at least one of said contact elements of said first connector;
  C. a clamping rod extending freely through apertures in the contact elements of each said first connector;
  D. a first cam follower affixed to one end of said rod;
  E. a second cam follower movably supported on said rod adjacent said one end thereof in juxtaposed relation with said first cam follower;
  F. a stop affixed to the other end of said rod;
  G. a first compression spring supported on said rod intermediate said second cam follower and said first connector;
  H. a second compression spring supported on said rod intermediate said stop and said first connector; and
  I. a cam mounted for movement between joint clamped and joint unclamped positions, said cam having interconnected high and low cam surfaces, with said cam in said unclamped position, said low cam surface engaging said first and second cam followers to sustain said first and second springs in substantially uncompressed conditions such as to permit said contact elements of said first and second connectors to readily move into and out of lapped relation, with said cam in said clamped position, said high cam surface camming said first and second cam followers in opposite directions to impart a predetermined equal degree of compression to said first and second springs, said compressed springs developing equal and opposite forces clamping said lapped contact elements in secure electrical interconnection.

13. The electrical joint apparatus defined in claim 12, which further includes at least one additional first connector and an additional second connector each having contact elements arranged for juxtaposition in lapped relation, an additional clamping rod extending freely through apertures in the contact elements of said additional first connector, additional first and second cam followers respectively affixed to one end of said additional clamping rod and movably supported on said additional clamping rod adjacent said one end thereof in juxtaposed relation with said additional first cam follower, an additional stop affixed to the other end of said additional clamping rod, additional first and second compression springs respectively supported on said additional clamping rod intermediate said additional second cam follower and said additional first connector and intermediate said additional stop and said additional first connector, and an additional cam mounted for movement between joint clamped and joint unclamped positions, said additional cam likewise having interconnected high and low cam surfaces camming said additional first and second cam followers in opposite directions to selectively control the compressed conditions of said additional first and second compression springs in clamping and unclamping said lapped contact elements of said additional first and second connectors, and means interconnecting said additional cam and said first mentioned cam for concerted movement between said joint clamped and unclamped positions to concurrently clamp and unclamp the lapped contact elements of said first and second connectors and the lapped contact elements of said additional first and second connectors.

14. Electrical joint apparatus comprising, in combination:
  A. first and second arrays of spaced first electrical connectors, each said first connector having plural contact elements arranged in parallel spaced relation;
  B. first and second arrays of spaced second electrical connectors, each said second connector of said first array associated with a different one of said first connectors of said first array and each said second connector of said second array associated with a different one of said first connectors of said second array, each said second connector having at least one contact element arranged for juxtaposition in lapped relation with said contact elements of its associated one of said first connectors;
  C. a separate elongated clamping rod extending freely through apertures in the first connector contact elements of said first and second arrays;
  D. insulators supported on each rod to fill the spaces between adjacent first connectors of each array;
  E. separate follower means supported on a corresponding one end of each said rod;
  F. a stop affixed to the corresponding other end of each said rod;
  G. compression spring means interposed between said stop and cam follower means of each array; and
  H. camming means movable between joint clamping and joint unclamping positions, said camming means, while in said unclamping position, controllably engaging both said cam follower means supported on each said rod to sustain both said compression spring means in substantially unloaded conditions to thereby permit said contact elements of associated first and second connectors to readily move into and away from lapped relation, said camming means operable in said clamping position to simultaneously cam both said cam follower means in a manner to uniformly load both said compression spring means, said loaded clamping spring means clamping said lapped contact elements of associated first and second connectors of said first and second arrays in secure electrical interconnection.

15. The electrical joint apparatus defined in claim 14, wherein said camming means comprises a separate cam acting on each of said cam follower means, a shaft supporting said cams and spanning the separation between said first and second arrays of first and second connectors, and means for selectively rotating said shaft to concurrently move said cams between said clamping and unclamping positions.

* * * * *

UNITED STATES PATENT OFFICE
CERTIFICATE OF CORRECTION

PATENT NO. : 4,032,207

DATED : June 28, 1977

INVENTOR(S) : Eric Axel Ericson and Frederick Daniel Kaufhold

It is certified that error appears in the above-identified patent and that said Letters Patent are hereby corrected as shown below:

Column 16, line 66, change "elecrical" to --electrical--

Column 20, line 35, after "each" insert --said--

Column 20, line 37, after "separate" insert --cam--

Signed and Sealed this

Twentieth Day of September 1977

[SEAL]

Attest:

RUTH C. MASON
Attesting Officer

LUTRELLE F. PARKER
Acting Commissioner of Patents and Trademarks